United States Patent
Cipollo et al.

(10) Patent No.: US 10,042,336 B2
(45) Date of Patent: Aug. 7, 2018

(54) USER-DEFINED SCENES FOR HOME AUTOMATION

(71) Applicant: Savant Systems, LLC, Hyannis, MA (US)

(72) Inventors: Nicholas J. Cipollo, Boston, MA (US); Andrew R. Hamm, East Sandwich, MA (US); Ryan E. Kitson, Brooklyn, NY (US); Nathan A. Trapp, Sandwich, MA (US); Cameron B. Pulsford, Marstons Mills, MA (US); Timothy R. Locascio, Osterville, MA (US); George T. Katsiris, Chatham, MA (US); Michael C. Silva, East Sandwich, MA (US); Jose J. Ronquillo Rodriguez, Mashpee, MA (US)

(73) Assignee: Savant Systems, LLC, Hyannis, MA (US)

( * ) Notice: Subject to any disclaimer, the term of this patent is extended or adjusted under 35 U.S.C. 154(b) by 333 days.

(21) Appl. No.: 14/481,575

(22) Filed: Sep. 9, 2014

(65) Prior Publication Data

US 2016/0070244 A1    Mar. 10, 2016

(51) Int. Cl.
*G05B 15/02* (2006.01)
*H04L 12/28* (2006.01)

(52) U.S. Cl.
CPC .......... *G05B 15/02* (2013.01); *H04L 12/2829* (2013.01); *H04L 2012/285* (2013.01)

(58) Field of Classification Search
CPC . G06F 9/44; G06F 3/048; G06F 17/00; G06F 13/00; G06F 3/00; G06F 17/24;

(Continued)

(56) References Cited

U.S. PATENT DOCUMENTS 6,756,998 B1 * 6/2004 Bilger ................. H04L 12/2803 715/734
6,834,208 B2 * 12/2004 Gonzales ............ H04L 12/2803 315/291

(Continued)

OTHER PUBLICATIONS

U.S. Appl. No. 14/282,734, filed May 20, 2014 by David W. Tatzel et al. for Automatic Configuration of Control Device User Interface in a Home Automation System, pp. 1-30.

(Continued)

*Primary Examiner* — Kenneth M Lo
*Assistant Examiner* — Mohammed Shafayet
(74) *Attorney, Agent, or Firm* — Cesari and McKenna, LLP; James A. Blanchette

(57) ABSTRACT

Techniques are provided for defining and activating scenes in a home automation system. In one embodiment, a user-defined scene is automatically captured based on current states in a home automation system and a last media query. Current states in the home automation system are automatically captured for services to build a set of states, the set of states including states of services provided by multiple different types of devices, the multiple different types including two or more of audio/video (A/V) devices, lighting devices, heating ventilation and cooling (HVAC) devices, security devices, shade control devices, energy conservation devices, or communications devices. A last media query performed by the home automation system is also captured. A user-defined scene is generated from both. The user-defined scene is stored, and when it is determined it should be activated, service requests are sent.

19 Claims, 18 Drawing Sheets

(58) Field of Classification Search
CPC ........ G06F 17/21; H04N 7/173; H04N 5/445; H04L 12/2829; H04L 2012/285; G05B 15/02
USPC .................................................... 700/275
See application file for complete search history.

(56) References Cited

U.S. PATENT DOCUMENTS

| | | | | |
|---|---|---|---|---|
| 6,844,807 | B2* | 1/2005 | Inoue | G05B 15/02 340/3.7 |
| 6,970,751 | B2* | 11/2005 | Gonzales | G05B 19/042 340/3.3 |
| 7,099,723 | B2 | 8/2006 | Gonzales et al. | |
| 7,415,310 | B2* | 8/2008 | Bovee | H04L 12/282 700/9 |
| 7,843,333 | B2* | 11/2010 | Angelhag | G01S 5/14 340/12.53 |
| 7,864,043 | B2* | 1/2011 | Camp, Jr. | G01S 5/0252 340/539.13 |
| 8,316,309 | B2* | 11/2012 | Bartek | G06F 9/4446 715/744 |
| 8,380,359 | B2* | 2/2013 | Duchene | G05B 19/042 700/276 |
| 8,473,325 | B2* | 6/2013 | Barnhill, Jr. | H04L 12/2809 705/7.29 |
| 8,490,006 | B1* | 7/2013 | Reeser | G05B 15/02 700/18 |
| 8,640,038 | B1* | 1/2014 | Reeser | G05B 15/02 382/155 |
| 8,914,724 | B2* | 12/2014 | Cipollo | G06F 3/04847 700/1 |
| 9,088,663 | B2* | 7/2015 | Arling | G06F 3/0486 |
| 9,306,763 | B2* | 4/2016 | Tatzel | G06F 3/0484 |
| 9,360,874 | B2* | 6/2016 | Imes | G05B 15/02 |
| 9,397,852 | B2* | 7/2016 | Sellers | G06F 3/04847 |
| 2001/0011284 | A1* | 8/2001 | Humpleman | H04L 12/2805 715/205 |
| 2003/0040813 | A1* | 2/2003 | Gonzales | H01H 15/005 700/19 |
| 2003/0074088 | A1* | 4/2003 | Gonzales | G05B 19/042 700/19 |
| 2003/0229900 | A1* | 12/2003 | Reisman | G06F 17/30873 725/87 |
| 2004/0163073 | A1* | 8/2004 | Krzyzanowski | H04L 12/2803 717/107 |
| 2005/0030196 | A1* | 2/2005 | Harris | G08C 17/00 340/12.26 |
| 2005/0080782 | A1* | 4/2005 | Ratnaparkhi | G06F 17/30654 |
| 2005/0085930 | A1* | 4/2005 | Gonzales | G05B 19/042 700/86 |
| 2005/0094610 | A1* | 5/2005 | de Clerq | G05B 15/02 370/338 |
| 2005/0097618 | A1* | 5/2005 | Arling | H04L 12/2805 725/114 |
| 2005/0159823 | A1* | 7/2005 | Hayes | G05B 15/02 700/19 |
| 2006/0020353 | A1* | 1/2006 | Gonzales | G05B 19/042 700/86 |
| 2007/0112939 | A1* | 5/2007 | Wilson | H04L 12/2807 709/219 |
| 2007/0192486 | A1* | 8/2007 | Wilson | H04L 12/282 709/225 |
| 2008/0064395 | A1* | 3/2008 | Sibileau | G08C 17/02 455/433 |
| 2008/0127063 | A1* | 5/2008 | Silva | H04L 12/2809 717/107 |
| 2008/0201753 | A1* | 8/2008 | Arling | H04L 12/2805 725/114 |
| 2008/0201754 | A1* | 8/2008 | Arling | H04L 12/2805 725/114 |
| 2009/0077167 | A1* | 3/2009 | Baum | G06F 17/30017 709/203 |
| 2010/0138007 | A1* | 6/2010 | Clark | H04L 12/2809 700/90 |
| 2010/0312366 | A1* | 12/2010 | Madonna | H05B 37/0245 700/90 |
| 2011/0140832 | A1* | 6/2011 | Vinkenvleugel | H05B 37/0272 340/4.2 |
| 2011/0157476 | A1* | 6/2011 | Arling | H04L 12/2805 348/731 |
| 2011/0167348 | A1* | 7/2011 | Silva | H04L 12/2809 715/716 |
| 2012/0260166 | A1* | 10/2012 | Cipollo | G06F 3/04847 715/716 |
| 2012/0260206 | A1* | 10/2012 | Cipollo | H04L 41/22 715/771 |
| 2012/0262628 | A1* | 10/2012 | Wilson | H04L 12/2807 348/552 |
| 2012/0278453 | A1* | 11/2012 | Baum | H04L 41/0846 709/220 |
| 2013/0060357 | A1* | 3/2013 | Li | G05B 15/02 700/90 |
| 2013/0198785 | A1* | 8/2013 | Arling | H04L 12/2805 725/62 |
| 2013/0219438 | A1* | 8/2013 | Arling | H04L 12/2805 725/93 |
| 2014/0181704 | A1* | 6/2014 | Madonna | H05B 37/0245 715/762 |
| 2015/0332586 | A1* | 11/2015 | Hamm | G08C 17/02 340/12.5 |

OTHER PUBLICATIONS

"Notification of Transmittal of the International Search Report and the Written Opinion of the International Searching Authority, or the Declaration," International Filing Date: Sep. 5, 2015, International Application No. PCT/US2015/048873, Applicant: Savant Systems, LLC, dated Nov. 24, 2015, pp. 1-14.

* cited by examiner

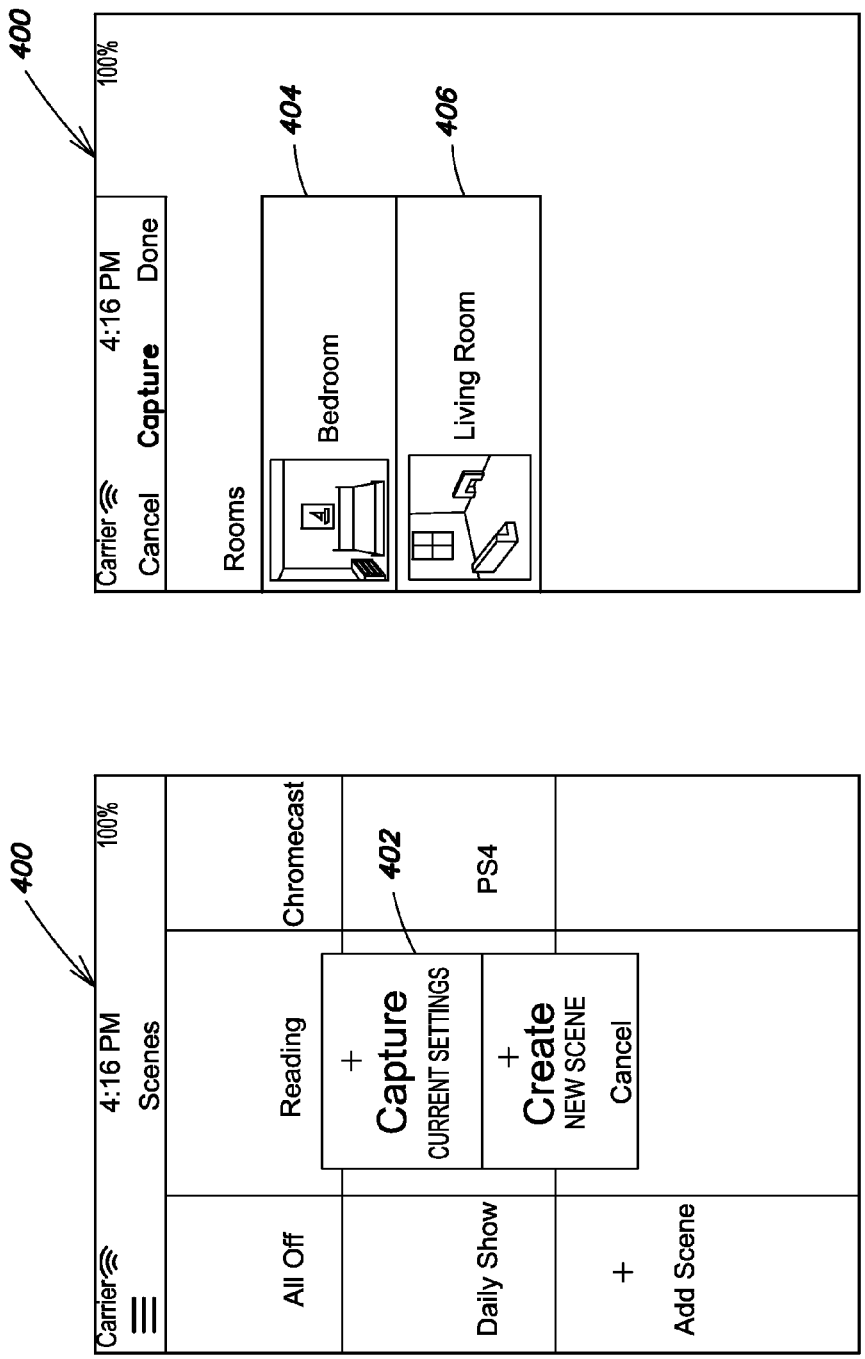

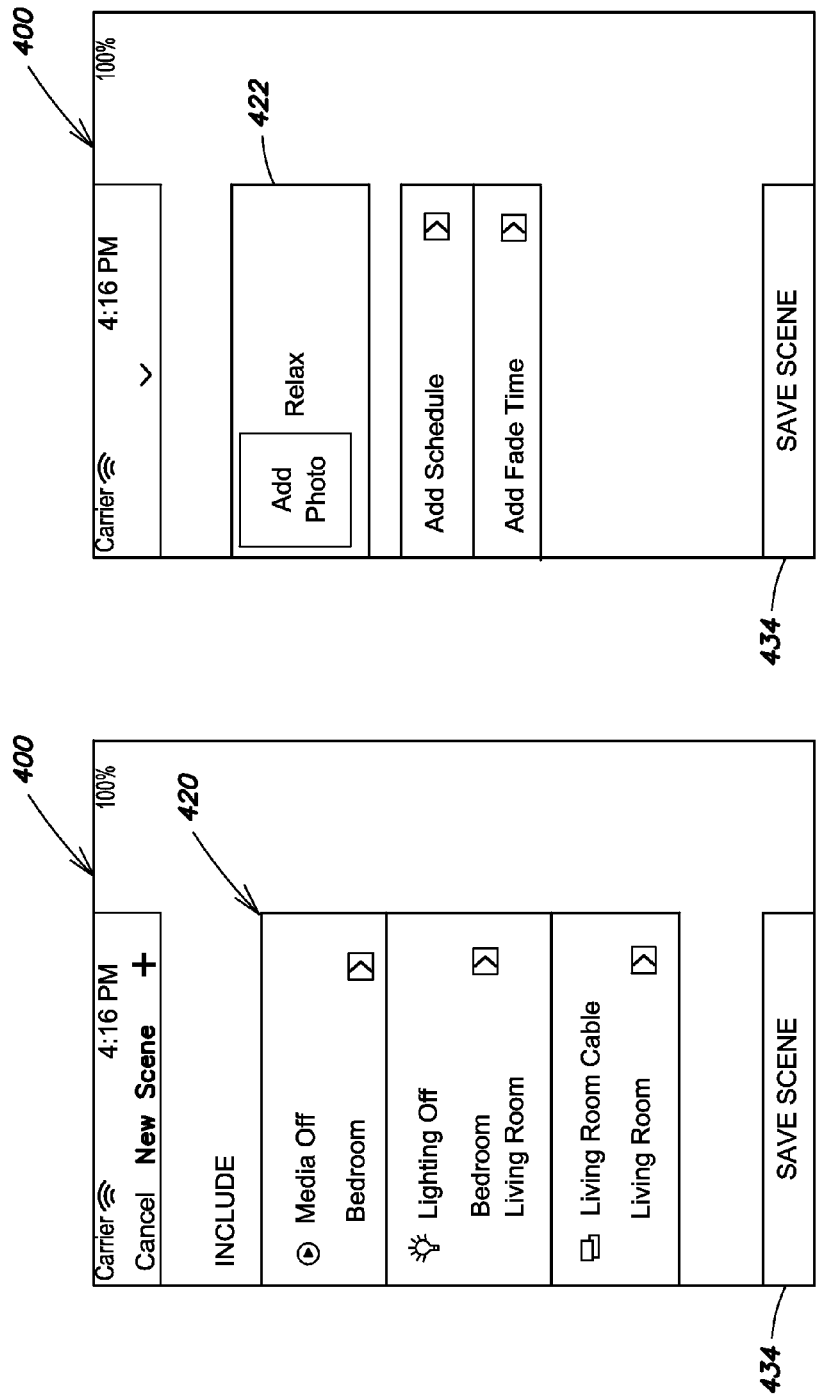

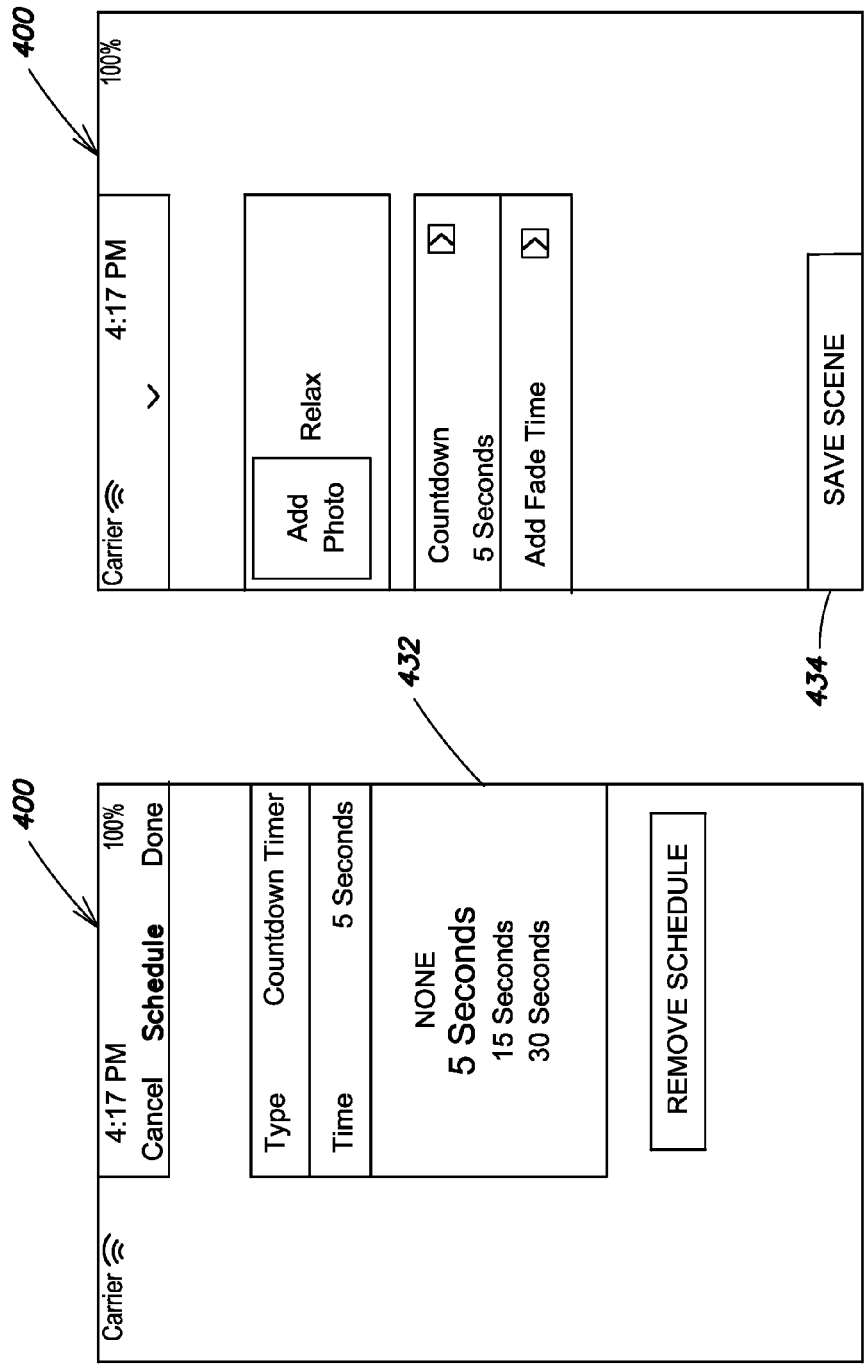

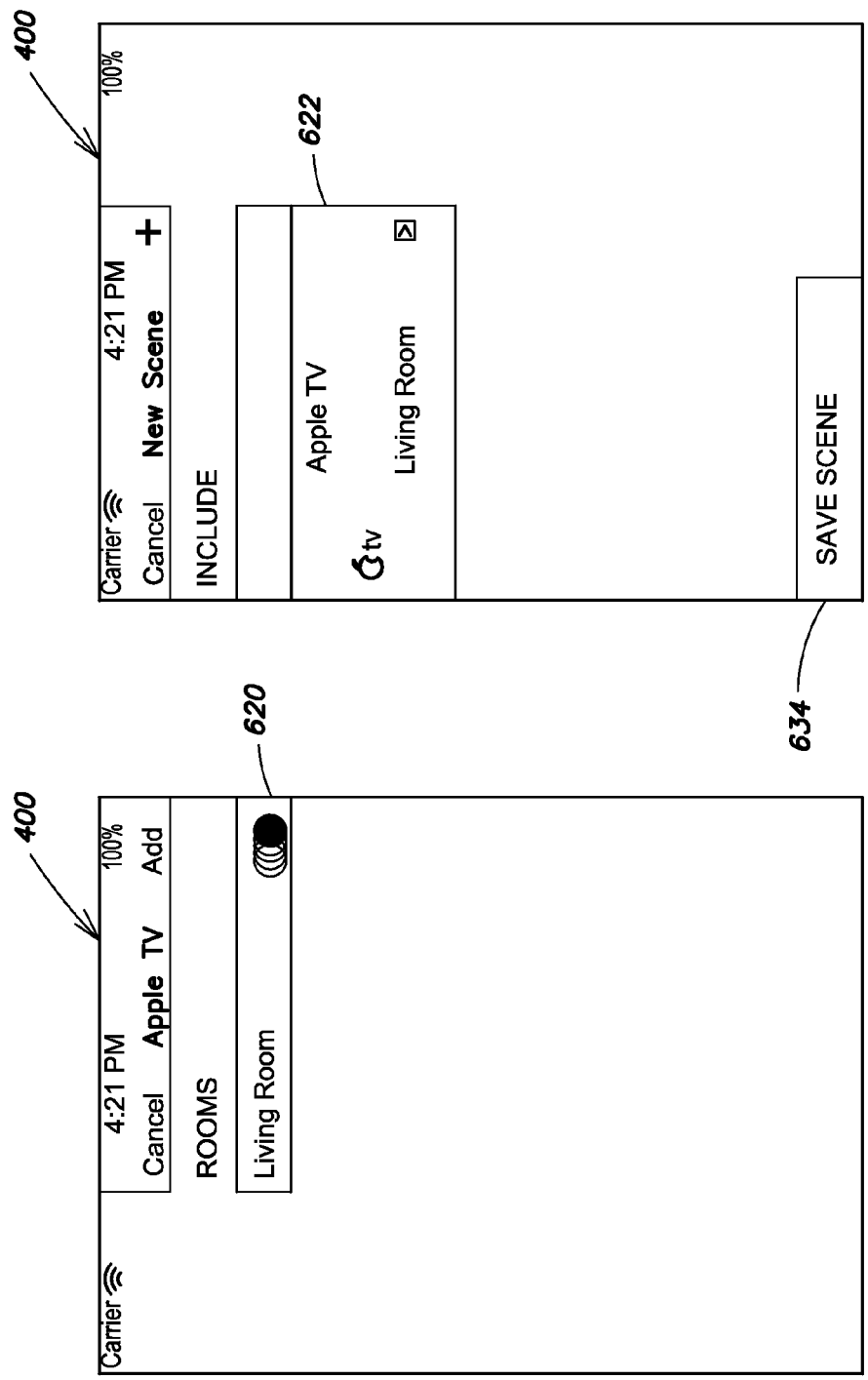

USER-DEFINED SCENES FOR HOME AUTOMATION

BACKGROUND

Technical Field

The present disclosure relates generally to home automation systems and more specifically to use of scenes in home automation systems.

Background Information

Home automation systems are becoming increasingly popular in both residential and commercial structures. Such systems may be capable of controlling, switching data between, and otherwise interacting with a wide variety of devices, including audio/video devices (A/V) devices, heating ventilation and cooling (HVAC) devices, security devices, energy conservation devices, communications devices, telephony devices, and/or other types of devices. Often, a user indicates desired actions in a home automation system by individually selecting devices and indicating actions they should perform. For example, a user may select a light fixture and indicate that it should be switched on. While this type of control may be adequate for home automation systems that include a relatively limited number of devices, it may prove limiting in systems with large numbers of devices. In such systems, users may desire more complex experiences involving the simultaneous control of many devices in response to a single selection or trigger.

Some systems may allow for the creation of macros or "scenes" that, when activated, can control a collection of devices in a predefined manner. For example, a scene may be programmed for walkup conditions in the morning, and when activated cause the home automation system to raise lights in a bedroom, set background music to a low volume, open shades, turning on a bathroom light, etc. Likewise, scenes may be programmed for other types of experiences.

While the use of scenes may allow for enhanced control in home automation systems, they typically are difficult and time consuming to program in the first place. In some home automation systems, custom code may need to be written to program certain types of scenes. In other home automation systems that provide some sort of scene creation graphical user interface (GUI), a lengthy series of device and corresponding action selections may need to be manually entered to define a scene. A person programming the scene may need to have a detailed understanding of the system configuration, understand each device that should take an action and exactly what that action should be, and then manually enter such information. This may be time consuming and error prone. As a result, many end-users do not create their own scenes, and may instead rely instead upon a limited set of already available scenes (e.g., predefined in the system or programmed by an installer as part of an initial system installation), or fall back upon controlling devices individually.

Accordingly, there is a need for improved techniques that may allow end-users to easily define and activate scenes in home automation systems.

SUMMARY

Techniques are provided that may allow an end-user to easily define and activate scenes in a home automation system. In one embodiment, a user-defined scene is captured from current states of services in the home automation system, to effectively taking a "snapshot" of aspects of the current operating condition of the home automation system. To define the scene, a current state of services may be automatically captured to build a set of states. Further, one or more last media queries may be captured that indicate a currently playing (or last played) media item (e.g., a song, album, playlist, movie, etc.). The user may select one or more rooms of interest and, for each selected room, one or more services of interest. A scene may then be generated from the current states and the last media query for the rooms and/or services of interest. After any necessary modifications are made to the scene in response to user input, the scene may be persistently stored. At a later time, in response to a schedule or user-activation, the user-defined scene may be activated, and the home automation system caused to control the services and play media items to replicate the set of states of the user-defined scene.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings, of which:

FIGS. 4A-4M are example screen shots of a user interface (UI) of a control application (app) on a control device, relating to automatically capturing a user-defined scene based on current states;

FIGS. 6A-6K are example screen shots of the UI of the control app on the control device, relating to creating a user-defined scene based on user-supplied states.

DETAILED DESCRIPTION

An Example Home Automation System

Figure 1:
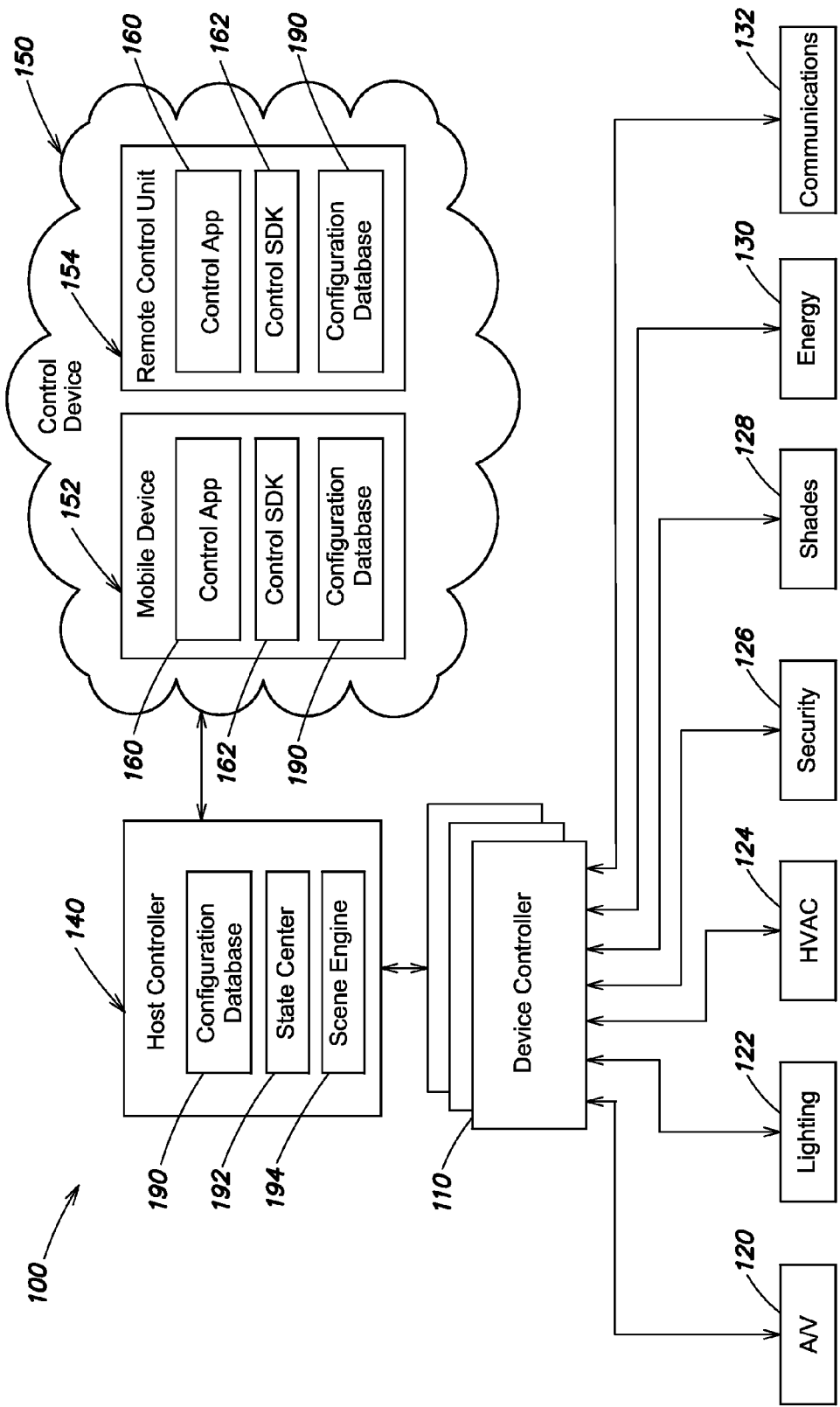
FIG. 1 is a block diagram of an example architecture of a home automation system operable to control devices about a structure (e.g., a home or commercial building)

FIG. 1 is a block diagram of an example architecture of a home automation system 100 operable to control devices about a structure (e.g., a home or commercial building). At the core of the system 100 are one or more device controllers 110 and a host controller 140. The device controllers 110 operate to switch signals between and provide low-level control to a variety of interconnected devices 120-132. The host controller 140 controls and monitors operations of the device controllers 110, as well as provides user interface (UI) interpretation, system administration and monitoring, and/or other high-level control functions. UIs for interacting with the home automation system 100 may be displayed to users on a variety of types of control devices 150.

More specifically, the device controllers 110 may provide N×N switching, audio and video processing, device control,
and other management functions to the various device 120-132 that are present. The devices 120-132 may include A/V devices 120 categorized into source devices that originate audio and/or video signals (such as media servers, cable boxes, digital video disc (DVD) players, media players, etc.), processing devices that manipulate audio and/or video signals (such as pre-amps, digital signal processors, amplifiers, etc.), and output devices that output audio and/or video signals (such as televisions, speakers, projectors, etc.). The devices 120-132 may also include lighting devices 122, such as lighting controllers, keypads, lamp modules, and the like. In addition, heating ventilation and cooling (HVAC) devices 124 may be provided that include one or more thermostat processing units, thermostats, sensors and the like. Security devices 126 may also be coupled to the device controllers 110, including motion sensors, security cameras, home healthcare sensors, related controllers, etc. Further, shade control devices 128 may be provided that include motor operated window shades, motor operated window blinds, related controllers, etc. Energy conservation devices 130 may be provided that include one or more energy monitors, current transformers, voltage sensors and the like. Still further, communications devices 132 may be present that provide telephony, intercom and other related functions, utilizing one or more private branch exchanges (PBXs), gateways, handsets, and other units.

The host controller 140 typically include a processor configured to execute software and manipulate data from data structures, and a storage device (e.g., a persistent or volatile memory, hard disk, solid state drive (SSD), etc.) including storage locations for storing the software and the data structures. The data structures may include a configuration database (e.g., structured as a relational database such as a structured query language (SQL) database) 190. The configuration database 190 may utilize logical representations to describe the configuration of the home automation system 100 and its devices 120-132, as well as to maintain other types of information. The software and data structures may also include a state center 192 that stores information describing the current operating condition of the home automation system 100. The operating condition may be represented as a number of discrete states of services provided by devices 120-132, for example, represented as Boolean values indicating information such as on or off, numeric values indicating information such a degree or volume level, or other types of values indicating other types of information. The software on the host controller 140 may include a scene engine 194 that works in conjunction with control devices 150 and interacts with the configuration database 190 and the state center 192 to manage "user-defined scenes". As used herein, the term "user-defined scene" refers to a multimedia experience within a portion of a structure caused by a plurality of devices that provide services assuming particular states and/or playing certain media times indicated to be desired by an end-user. Further details regarding the creation, maintenance and activation of user-defined scenes may be found below.

The control devices 150 may take a variety of forms, including mobile devices 152, remote control units 154, desktop computers (e.g., PCs), etc. As used herein, the term "mobile device" refers to a general purpose electronic device that executes a general-purpose operating system and is adapted to be transported on one's person. Devices such as tablet computers (e.g., the iPad® tablet running an iOS® operating system) and smartphones (e.g., the iPhone® smartphone running an iOS® operating system or an Android® smartphone running an Android® operating system) are considered mobile devices. Desktop computers would generally not be considered mobile devices. As used herein, the term "remote control unit" refers to a portable special-purposes electronic device that is configured to control a home automation system, or a portion thereof. Typically a remote control unit is not suited for general-purpose operation, and is instead adapted to operate with one or more types of home automation systems.

Regardless of their type, control devices 150 typically include a processor configured to execute software and manipulate data from data structures, and a storage device (e.g., a persistent or volatile memory, hard disk, solid state drive (SSD), etc.) including storage locations for storing the software and the data structures. Further, control devices 150 typically include a display screen (e.g., a touch sensitive display screen. Control devices may also include a variety of other types of hardware, including a portable power source (e.g., a battery), a wireless communications interface, input devices (e.g., buttons, a camera, an orientation sensor, etc.), and the like.

Each control devices 150 may execute an application, for example, a control application (app) 160, that presents a UI to a user, and relays control commands back to the host controller 140, for example, over a wireless (e.g., wireless local area network (WLAN) connection. The control app 160 may utilize a control software development kit (SDK) 162 that, among other functionality, provides methods for querying the configuration database 190 and state center 192, and for interacting with the scene engine 194. In some cases, local copies of configuration information and/or state information may be transferred (e.g., downloaded) and maintained on the control devices 150. For example, a local copy of the configuration database 190 may be maintained on the control device 150. The control SDK 162 may be responsible for detecting when the local versions of information are out of date (or no local versions are present), and obtaining updated information from the host controller 140.

Examples of Logical Representations

The configuration database may utilize a variety of different types of logical representations to describe the configuration of the home automation system 100 and its devices 120-132. For example, the logical representations may include, "rooms", "components", "services", and "service requests", among others.

In this context, a "room" refers to a portion of a structure in which a user may participate in one or more home automation activities. A "room may correspond to a physical room within the structure or another region of space.

A "component" refers to a device under the control of a home automation system. A component may be associated with a profile, e.g., a machine readable markup language (e.g., XML) description of the device's capabilities and input/output (I/O) interfaces.

A "service" refers to an activity a user can participate in one or more rooms involving interaction of a plurality of components to provide a user experience. For example, one possible service may be a "Cable TV" service in which a user may watch cable television and that utilizes particular components, such as a cable box, television, speakers, media switch, and receiver.

A "service request" (or "request") refers to a command supported by a service. For example, a request of the above discussed "Cable TV" service may be "channel up", "channel down", "volume up", "volume down", etc. By using service requests, a service may be controlled.

Examples of Scene Objects

Figure 2:
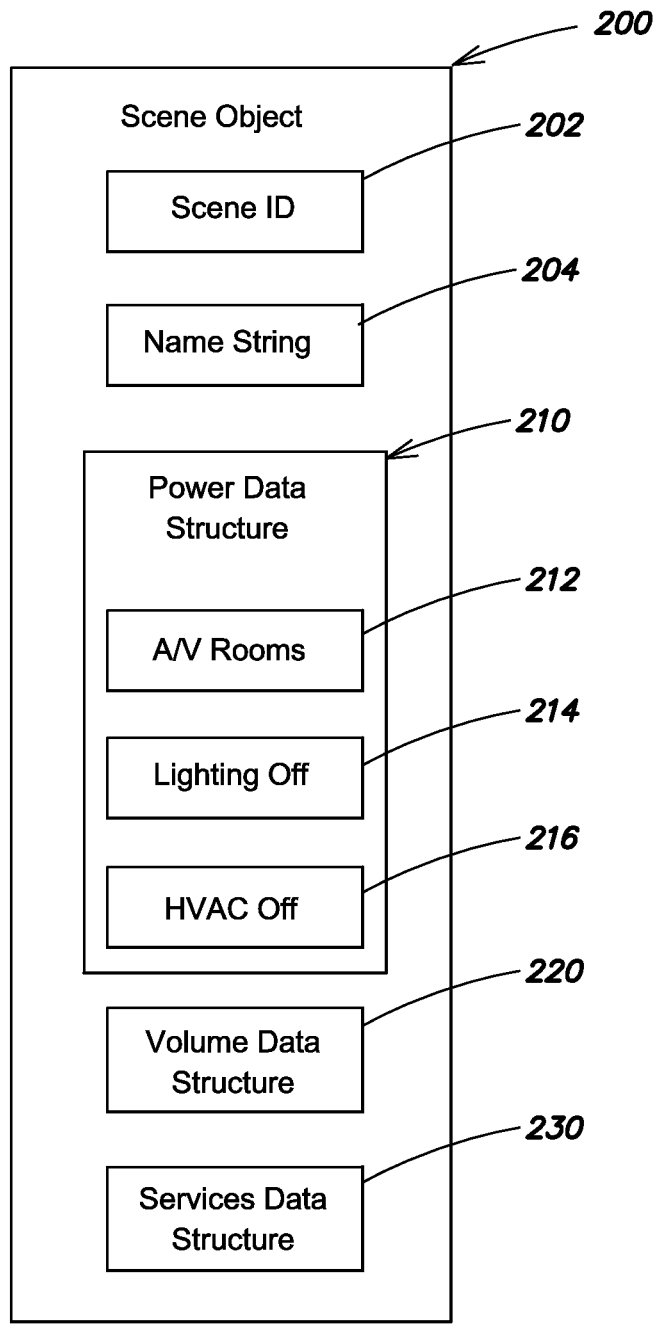
FIG. 2 is a block diagram of an example scene object that may be utilized by the scene engine to maintain a scene.

Building upon these logical representations, a user-defined scene may be maintained in a "scene object." FIG. 2 is a block diagram of an example scene object 200 that may be utilized by the scene engine 194 to maintain a user-defined scene. The scene object 200 may be identified by a unique scene identifier (ID) 202, as well as a user provided name string 204. A number of high level data structures (e.g., dictionaries storing key-value pairs) may also be provided. The high level data structures may include a power data structure (e.g., a power dictionary) 210, a volume data structure (e.g., a volume dictionary) 220, and a services data structure (e.g., a services dictionary) 230, among other data structures.

The power data structure 210 may define whether devices 120-132 should be turned on, turned off, or remain unchanged by the user-defined scene. To that effect, the power data structure 210 may include an A/V rooms structure (e.g., an A/V rooms key) 212 containing a mapping of rooms to services involving A/V devices 120 (e.g., a dictionary of rooms mapped to a dictionary of services involving A/V devices 120) with an indication (e.g., a Boolean) indicating whether the service should be powered on or off in the corresponding room. If a room is mapped to no services, it may be assumed that all A/V devices 120 in that room should be powered off. If a room is not included in the A/V rooms structure 212, it may be assumed that the power state of A/V devices 120 in the room remain unchanged by the user-defined scene. Further, the power data structure 210 may include a lighting off structure (e.g., an array of rooms) 214 indicating rooms in which lighting devices 122 are all powered off by the user-defined scene. Similarly, the power data structure 210 may include an HVAC off structure (e.g., an array of rooms) 216 indicating rooms in which HVAC devices 124 are all powered off by the user-defined scene.

Further, the volume data structure 220 may define volume levels for rooms. If a room is not specified, it may be assumed that the volume level in that room remains unchanged. In addition, the services data structure 230 may define state changes to be provided in connection with services. The services data structure 230 may be keyed by component, and include entries that contain a listing of rooms that are affected, and a list of state changes. If a state is not mentioned in the list of state changes, it may remain unchanged.

The scene object 200 may be responsive to a number of commands, including a remove command which deletes a user-defined scene, an apply command that immediately applies a user-defined scene, an activate schedule command that activates a scheduled user-defined scene, a deactivate schedule command that deactivates a scheduled user-defined scene, a capture command that may be used to create a new user-defined scene from automatic capture of current states, a create command that may be used to create a new user-defined scene from user-supplied states, as well as a variety of other commands.

Defining a Scene

User-defined scenes maintained in scene objects 200 may be defined in multiple different ways, for example, in connection with the capture and create commands of a scene object 200. In one embodiment, in connection with a capture command, a user-defined scene may be defined by automatic capture of current states of services, to effectively take a "snapshot" of aspects of the current operating condition of the home automation system. The scene engine 194 may automatically capture the current state of services to build a set of states, for example, by fetching current states from the state center 192. The scene engine 194 may also automatically capture one or more last media queries that indicate currently playing (or last played) media items (e.g., a song, album, playlist, movie, etc.), for example, by accessing a saved playback action of an A/V device 120, such as a media server. A user may select one or more rooms of interest and, for each selected room, one or more services of interest, for example, in the UI of the control app 160 on a control device 150. The scene engine 194 may then generate a user-defined scene from the current states and the last media query for the one or more rooms and/or services. After any necessary modifications are made to the user-defined scene (e.g., in response to further user input in the UI of the control app 160 on the control device 150), the user-defined scene may be persistently stored in its scene object 200 in the configuration database 190.

In an alternative embodiment, in connection with a create command, a user-defined scene may be created based on user-supplied states. A user may select one or more services of interest, and for each selected service, one or more rooms in which it is available, for example, using the UI of the control app 160 on a control device 150. For each room, the user may also supply one or more explicit states (e.g., represented as Boolean values indicating information such as on or off, numeric values indicating information such a degree or volume level, or other types of values indicating other types of information). The scene engine 194 may then generate a user-defined scene from the user-supplied states. After any necessary modifications are made to the user-defined scene (e.g., in response to further user input in the UI of the control app 160), the user-defined scene may be persistently stored in a scene object 200 in the configuration database 190.

More details regarding these techniques for defining scenes may be found in the following description.

i. Automatically Capturing a User-Defined Scene

Figure 3:
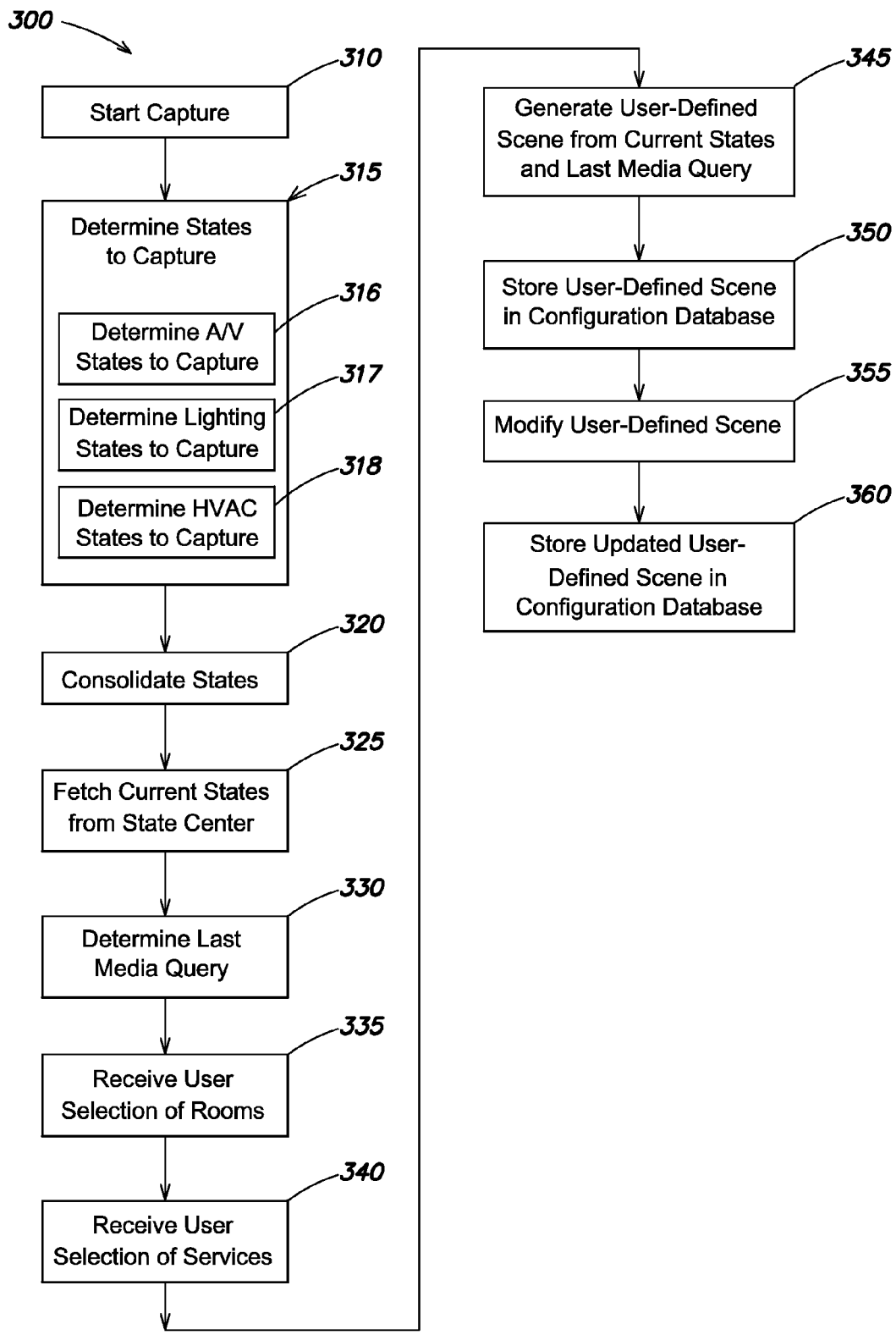
FIG. 3 is a flow diagram of an example sequence of steps for automatically capturing a user-defined scene based on current states of services in a home automation system.

FIG. 3 is a flow diagram of an example sequence of steps 300 for automatically capturing a user-defined scene based on current states of services in a home automation system. Such steps may be better understood by reference also to FIGS. 4A-4M, which are example screen shots of the UI 400 of the control app 160 on the control device 150. At step 310 and in reference to FIG. 4A, selection of UI element 402 may start capture of a user-defined scene based on current states.

At step 315, the scene engine 194 may determine which states to capture. Step 315 may include sub-steps for states associated services provided by various types of devices of the home automation system. For example, at sub-step 316, the scene engine 194 may determine one or more A/V states of services provided by A/V devices 120 to capture. At sub-step 317, the scene engine 194 may determine one or more lighting states of services provided by lighting devices 122 to capture. At sub-step 318, the scene engine 194 may determine one or more HVAC states of services provided by HVAC devices 124 to capture. Likewise, in other sub-steps (not shown), the scene engine 194 may determine one or more other states of services provided by other types devices to capture. At step 320, the scene engine 194 may consolidate the states into a set of states. Further, at step 325, the scene engine 194 may determine current states for the set of states by fetching them from the state center 192. At step 330, the scene engine 194 may determine one or more last media queries indicating a currently playing (or last played) item. The scene engine may access one or more saved playback actions of an A/V device 120, such as a media server, to obtain a last media query.

Figure 4D:
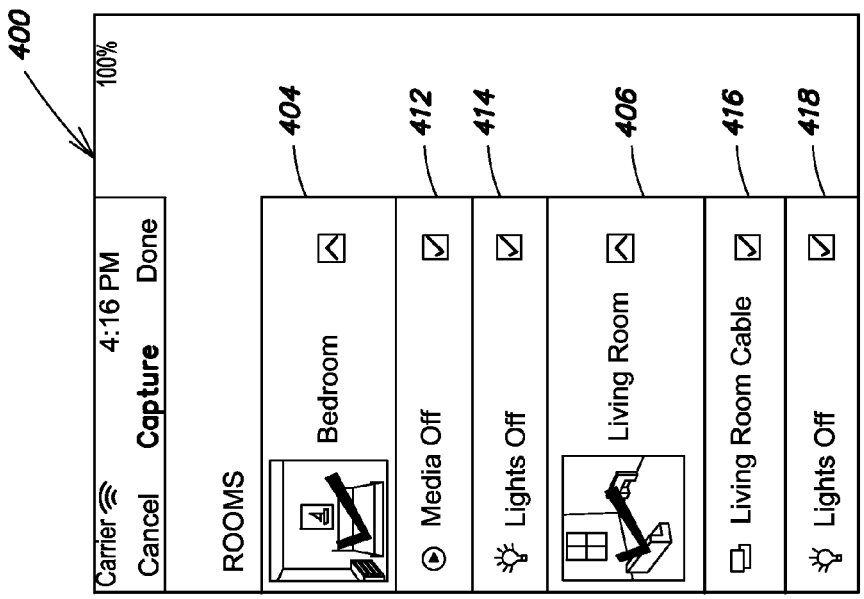
Figure 4C:
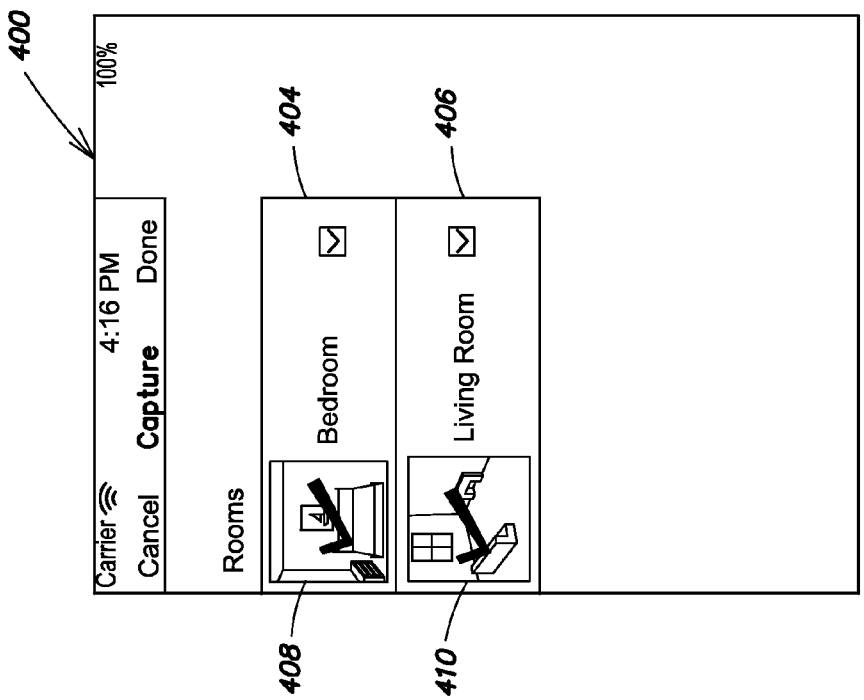
Figure 4H:
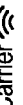
Figure 4G:
Figures 4I, 4J:
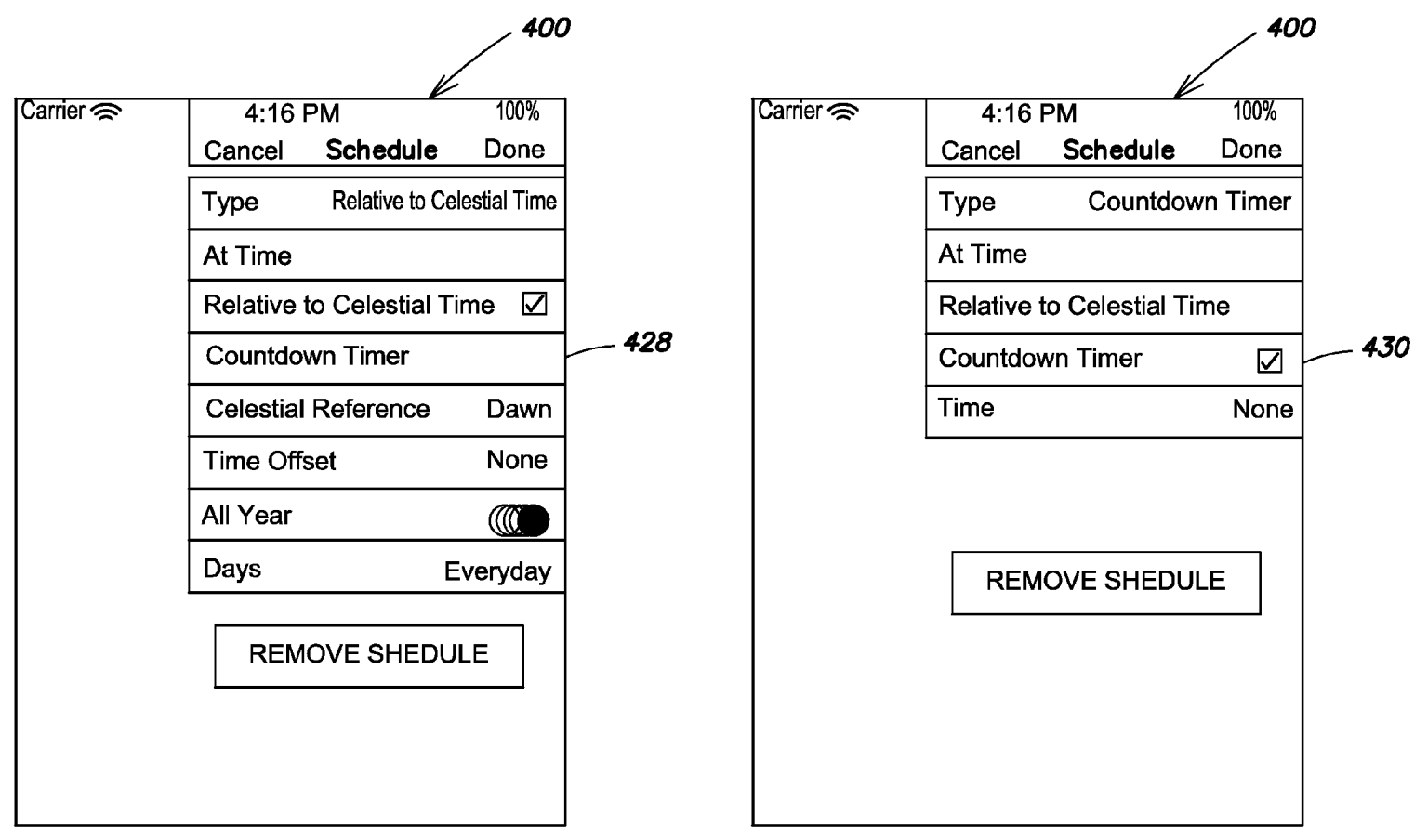
Figure 4M:
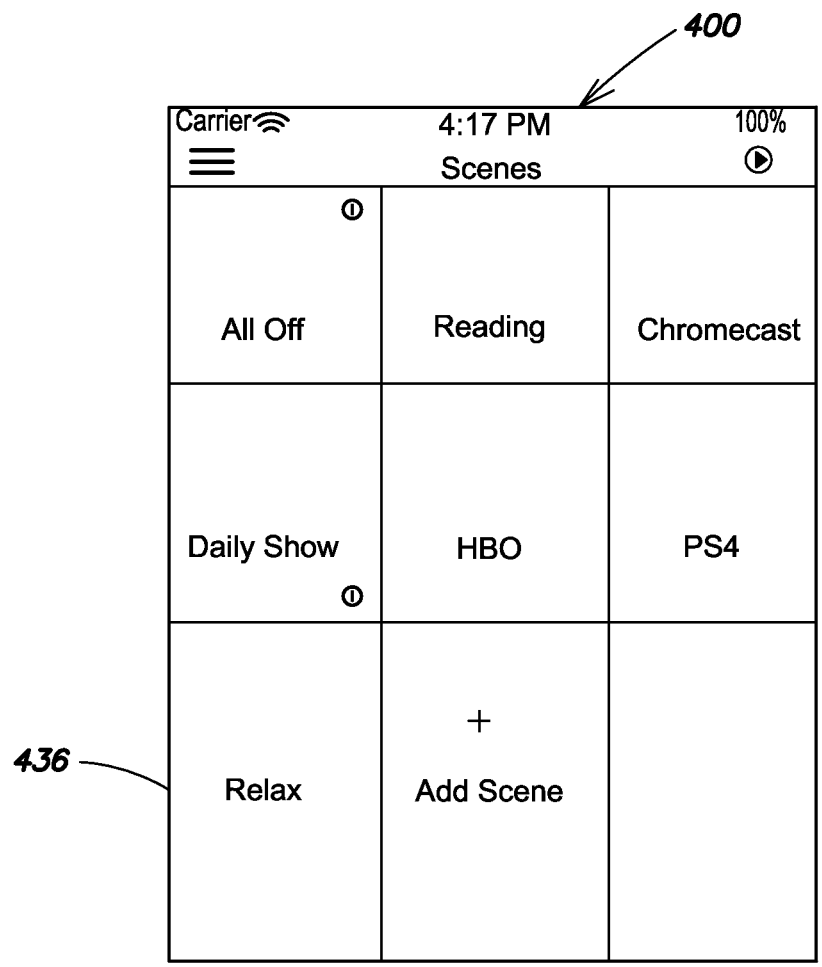

At step 335 and in reference to FIGS. 4B-4C, a user selection of one or more rooms of interest may be received in the UI 400. One or more UI elements 404, 406 may be displayed that represent rooms. In response to selection of the UI elements, indicators 408, 410 may confirm room selection. The one or more selected rooms may be a subset of the total number of rooms defined within the structure. At step 340 and in reference to FIG. 4D, a user selection of one or more services of interest may also be received in the UI 400. The user selection may be of one or more UI elements 412-418 in the UI 400 that represent services available in respective rooms. Then at step 345, the scene engine 194 may generate a user-defined scene from the current states and the last media query for the selected rooms and services. A summery 420 may be displayed, as shown in FIG. 4E. At step 350, the scene engine 194 may store the user-defined scene in the configuration database 190, for example, in response to activation of a UI element 434. As part of storing the user-defined scene, a name and/or photo may be associated with the user-defined scene in response to user input in a UI element 422.

At step 355 and in reference to FIGS. 4F-K, the control app 160 may modify the user-defined scene in response to user input in the UI 400. For example, in response to user input in UI elements 424-430, the user-defined scene may be scheduled to activate. For example, in response to user input in a UI element 426, the scene may be scheduled to activate when a particular time of day has been reached. Likewise, in response to user input in a UI element 428, the user-defined scene may be scheduled to activate when a celestial reference (e.g., dawn, sunset, etc.) has been reached. Similarly, in response to user input in UI elements 428-432, the user-defined scene may be scheduled to activate when a countdown timer has expired. At step 360 and in reference to FIG. 4L, the updated user-defined scene may be persistently stored in the configuration database 190, for example, in response to activation of a UI element 434. Thereafter, in reference to FIG. 4M, a scene UI element 436 for the user-defined scene may be displayed in the UI 400 of the control app 160. The user-defined scene may be activated in response to selection of a scene UI element 434 or one of the scheduling criteria discussed above.

ii. Creating a User-Defined Scene

Figure 5:
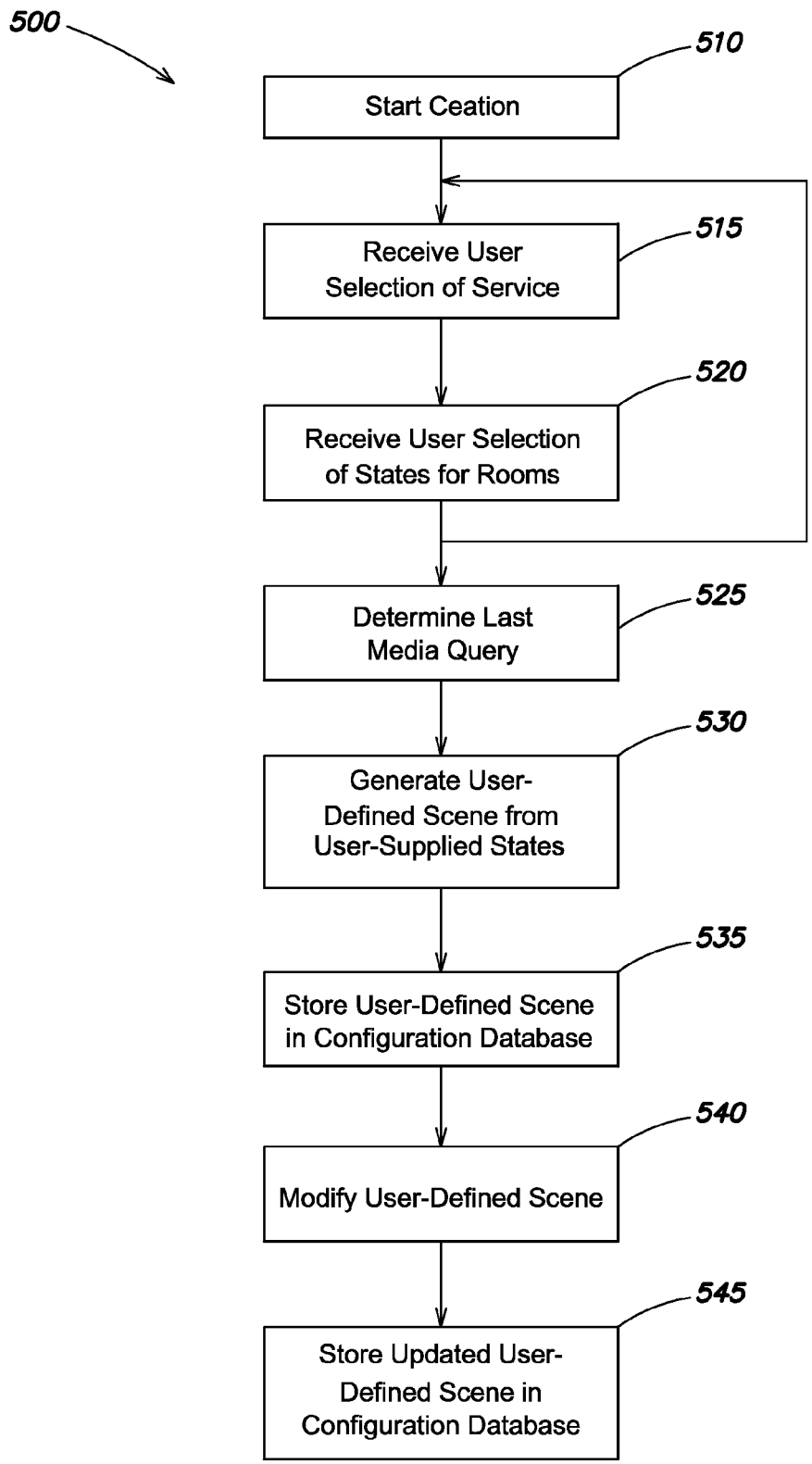
FIG. 5 is a flow diagram of an example sequence of steps for creating a user-defined scene based on user-supplied states.
Figures 6A, 6B:
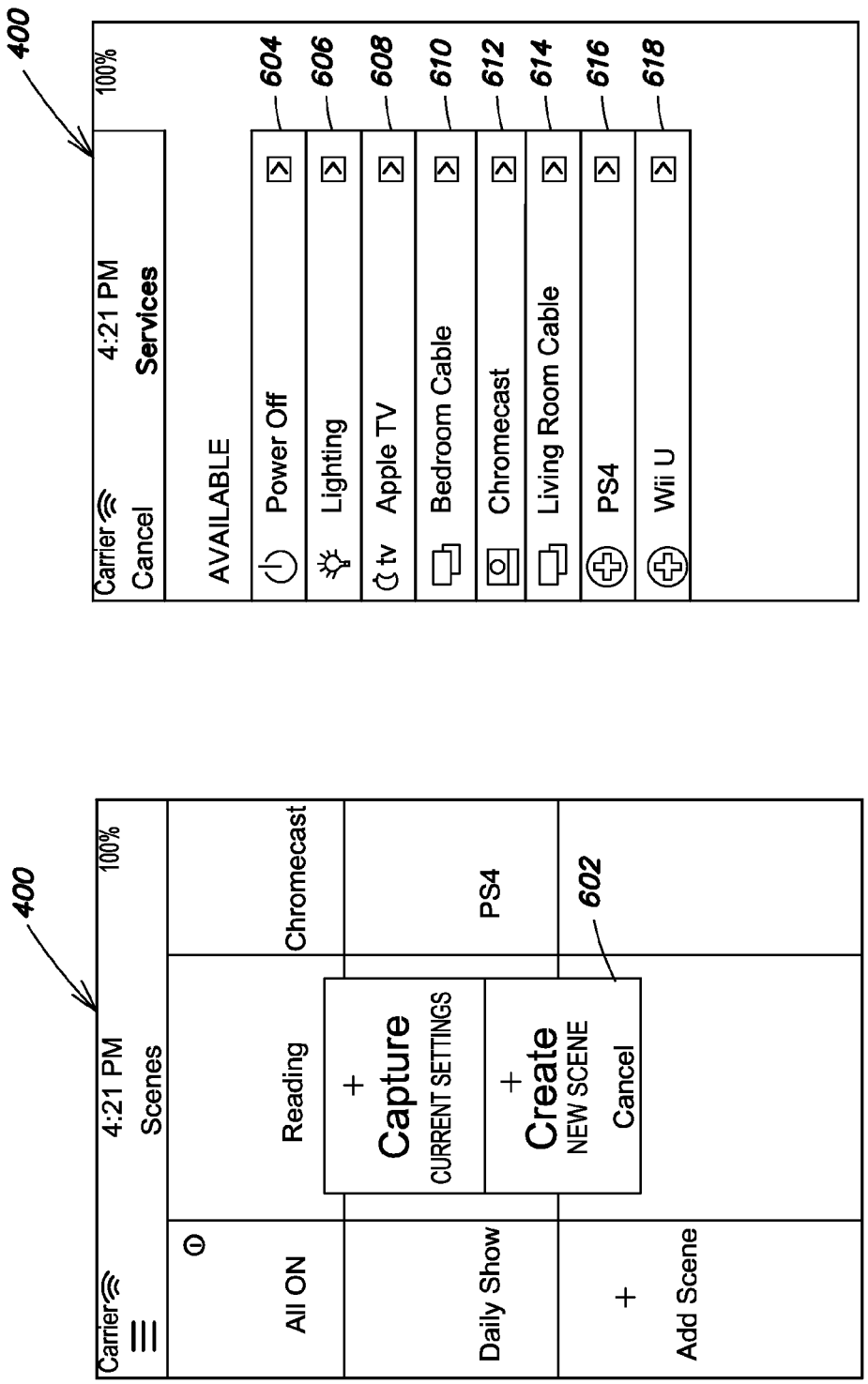
Figure 6F:
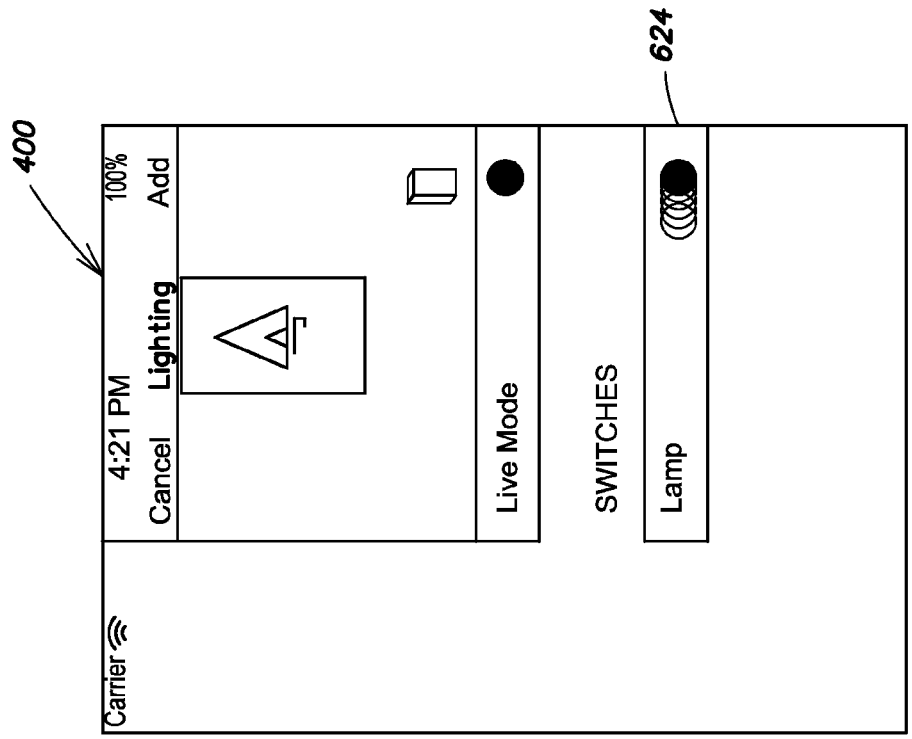
Figure 6E:
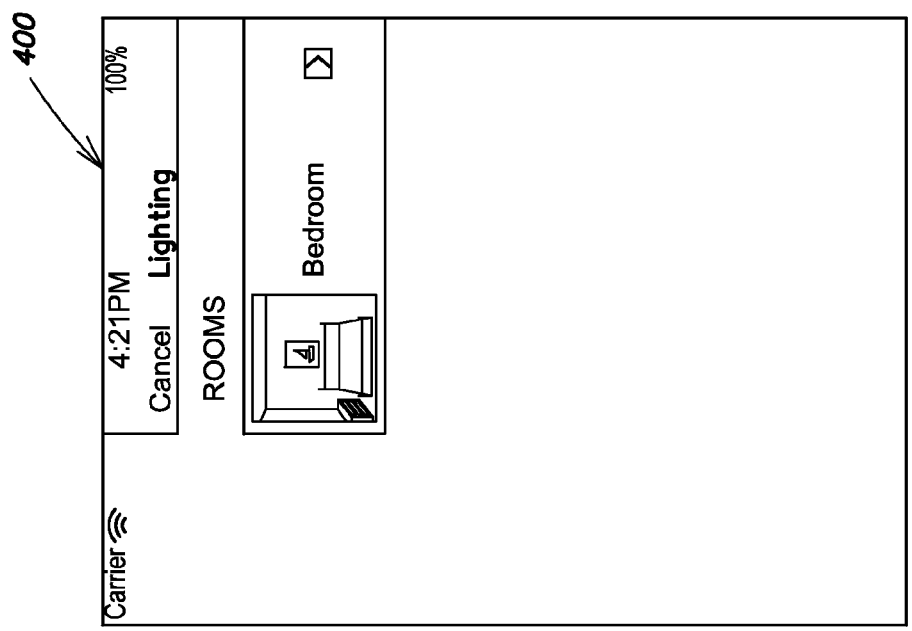

FIG. 5 is a flow diagram of an example sequence of steps 500 for creating a user-defined scene based on user-supplied states. Such steps may be better understood by reference also to FIGS. 6A-6K, which are example screen shots of the UI 400 of the control app 160 on the control device 150. At step 510 and in reference to FIG. 6A, a user selection of a UI element 602 may start creation of a user-defined scene based on user-supplied states. At step 515 and in reference to FIG. 6B, a user selection of a service may be received in the UI 400. The user selection may be of one or more UI elements 605-618 in the UI 400 that represent available services. At step 520 and in reference to FIG. 6C, a user selection of a state for a room may be received in the UI 400. The user selection may be in a UI element 620 in the UI 400. While only a single UI element 620 is shown in FIG. 6C, it should be understood that if a service is available in multiple rooms, multiple corresponding UI elements 620 may be shown to allow individual selections of states for rooms. Steps 515 and 520 may be repeated until the user has supplied a full set of states. A summery 622 may be displayed, as shown in FIG. 6D. Further, at sub-step 522 and in reference to FIGS. 6E-F, for some types of services (e.g., lighting services) in some rooms, user selection of states may be refined to indicate devices (e.g., lighting fixtures) or device groups that provide the service. While only a single UI element 624 is shown in FIG. 6F, it should be understood that when there are multiple devices (e.g., multiple lighting fixtures) or device groups that may provide a service (e.g., a lighting service), multiple corresponding UI elements 624 may be shown to allow individual refinement.

At step 525, the scene engine 194 may determine a last media query performed by the home automation system (e.g., the last audio and/or video content accessed). Then, at step 530, the scene engine 194 may generate a user-defined scene from the user-supplied states and the last media query. At step 535 and in reference to FIG. 6G, the scene engine 194 may store the user-defined scene in the configuration database 190, in response to activation of a UI element 634. As part of storing the user-defined scene, a name and/or photo may be associated with the user-defined scene in response to user input in a UI element 626.

Figure 6H:
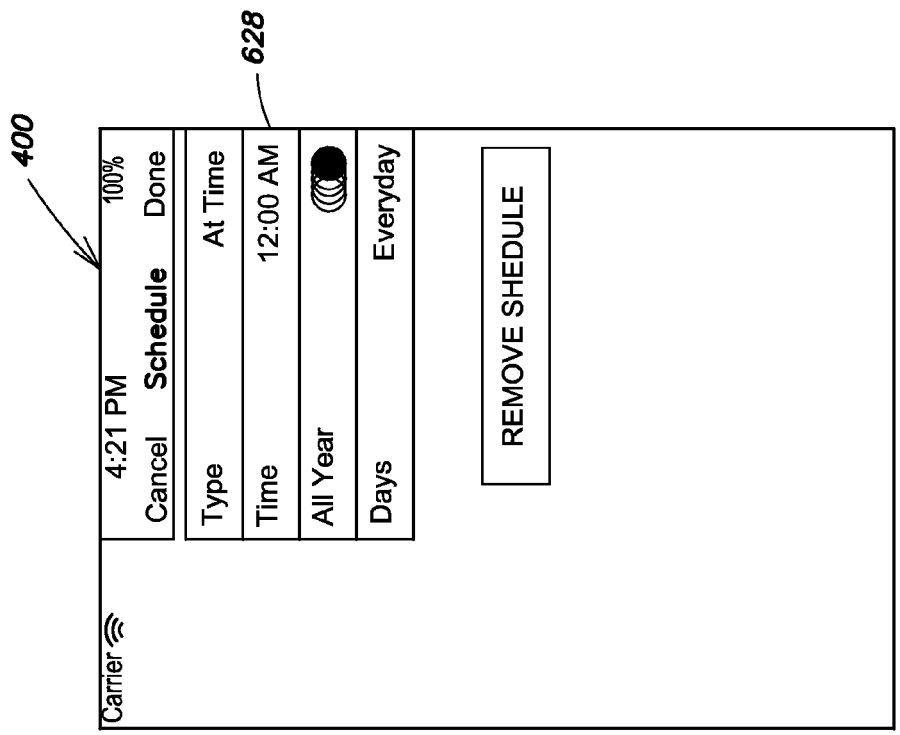
Figure 6G:
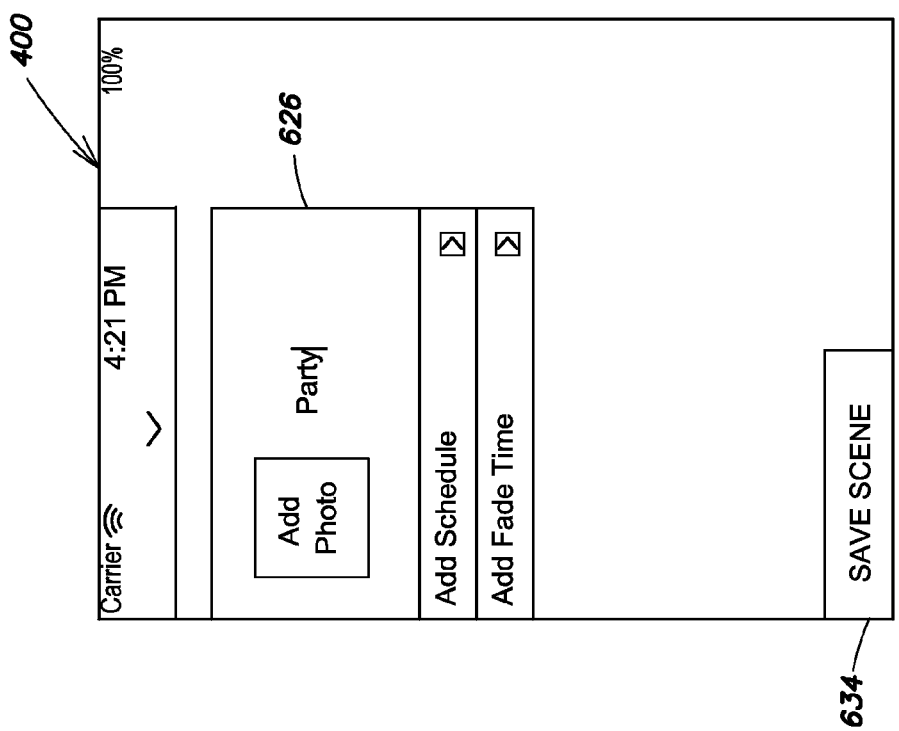
Figures 6I, 6J:
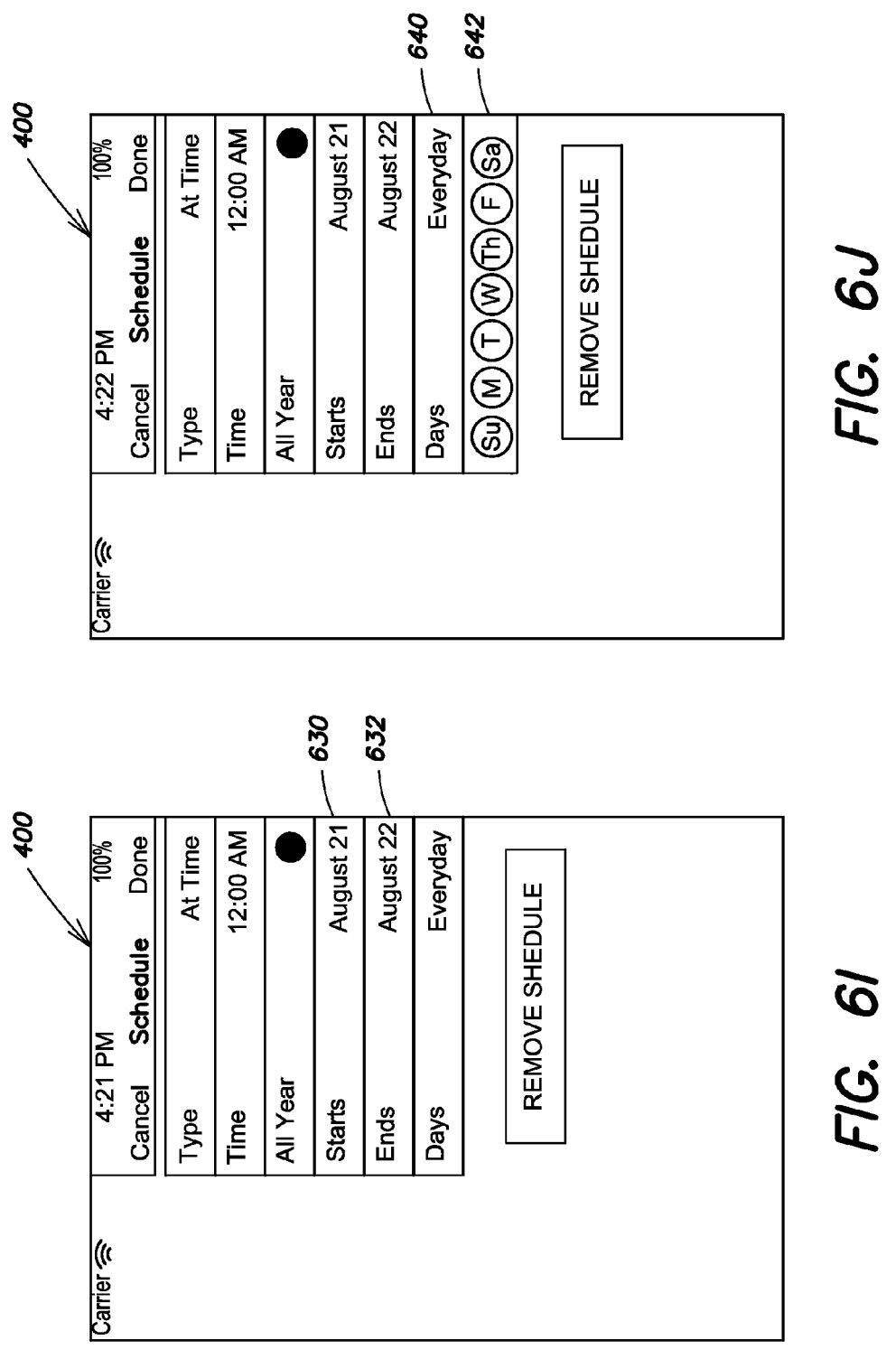
Figure 6K:
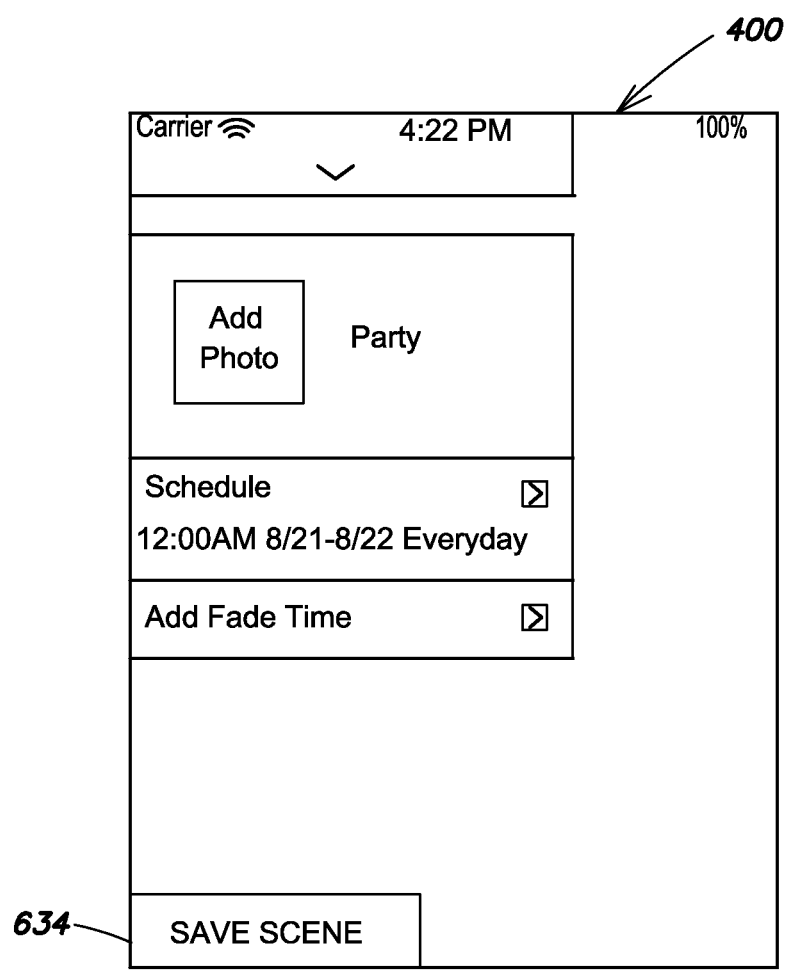

At step 540 and in reference to FIGS. 6H-J, the control app 160 may modify the user-defined scene in response to user input in the UI 400. For example, in response to user input in UI elements 628-642, the user-defined scene may be scheduled to activate at a certain time of certain days of certain months. Alternatively, the user-defined scene may be scheduled to activate when a celestial reference (e.g., dawn, sunset, etc.) has been reached, when a countdown timer has expired, or some other trigger is activated. At step 545 and in reference to FIG. 6K, the updated user-defined scene may be persistently stored in the configuration database 190, for example, in response to selection of a UI element 634. Thereafter, a scene UI element for the user-defined scene may be displayed in the UI 400 of the control app 160. The user-defined scene may be activated in response to selection of the scene UI element or one of the scheduling criteria discussed above.

Applying a User-Defined Scene

Figure 7:
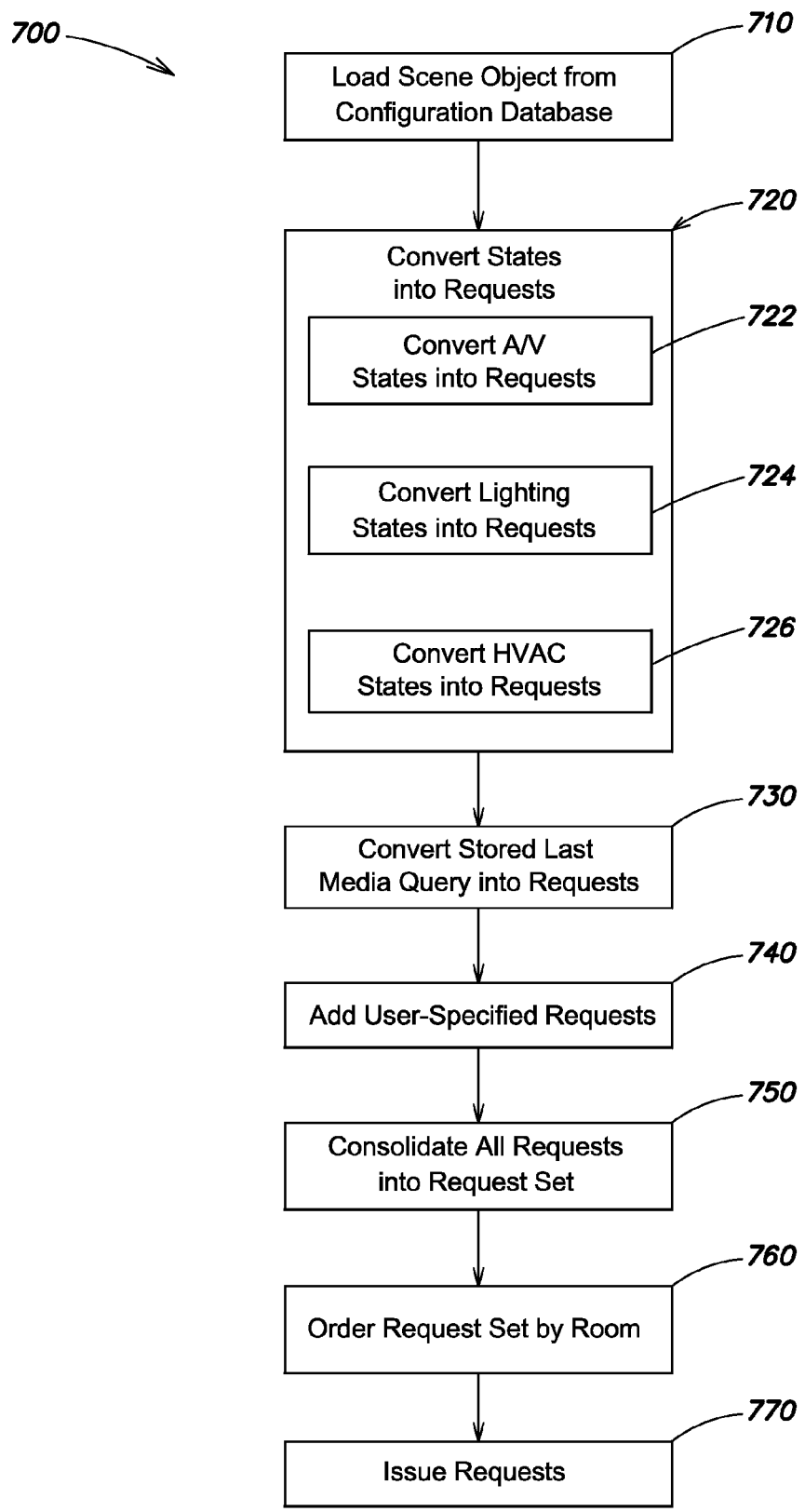
FIG. 7 is a flow diagram of an example sequence of steps for applying a user-defined scene.

When it is determined that a user-defined scene is to be activated (e.g., in response to a scheduling criteria or user input selecting the scene for activation), the scene engine 194 on the host controller 140 may apply the user-defined scene by accessing the user-defined scene, converting the states maintained in the user-defined scene and the stored media query into service requests, and issuing those service requests (e.g., via the device controllers 110) to control devices of the home automation system 100. FIG. 7 is a flow diagram of an example sequence of steps 700 for applying a user-defined scene. At step 710, the scene engine 194 may access the user-defined scene by loading its scene object 200 from the configuration database 190. At step 720, the scene engine 194 may convert the states maintained in the user-defined scene into service requests using specialized mapping logic and data tables. Step 720 may include sub-steps for converting states associated with services provided by various types of devices of the home automation system 100. For example, at sub-step 722, the scene engine 194 may convert one or more A/V states of services provided by A/V devices 120 into service requests using specialized mapping logic. At sub-step 724, the scene engine 194 may convert one or more lighting states of services provided by lighting devices 122 into service requests using mapping data tables. At sub-step 726, the scene engine 194 may convert one or more HVAC states of services provided by HVAC devices 124 into service requests using additional mapping data tables.

At step 730, the scene engine 194 may convert a stored last media query into a request. Further, at step 740, the scene engine 194 may access any user-specified service requests that may be associated with the user-defined scene. At step 750, all the converted or accessed service requests may be consolidated into a request set. At step 760, the request set may be organized (e.g., ordered) by room.

Finally, at step 770, the host controller 140 may issue the organized (e.g., ordered) service requests (e.g., via the device controllers 110) of the request set to control services provided by devices of the home automation system 100.

CONCLUSION

It should be understood that various adaptations and modifications may be made within the spirit and scope of the embodiments discussed herein. While some of the embodiments involve a home automation system that is capable of A/V control, lighting control, HVAC control, security control, shade control, energy conservation, and communications control, it should be understood that the techniques may be applicable to more limited systems that, for example, may control a lesser number of types of devices (e.g., only A/V devices and lighting devices, only lighting and HVAC device, etc.).

While some of the embodiments utilize a scene engine 194 to perform various ones of the operations described above, it should be understood that the operations of the scene engine 194 may be implemented by other software and/or hardware. For example, at least some of the operations may be performed by software executing on a control device 150, such as the mobile app 160, by software executing on a device controller 110, and/or by software executing on some other device of the home automation system 100. Similarly, at least some operations may be performed by a personal computer (PC) in communication with the home automation system 100. It should be understood that a variety of different arrangements may be possible.

In addition, many of the techniques above described as executed in software may be executed in hardware, and vice versa. Depending on the implementation, operations may be performed in software, in hardware, or in various combinations thereof. Software implementations may include machine-executable instructions (e.g., computer-executable instructions) stored in a non-transitory machine-readable medium (e.g., a non-transitory computer-readable medium), such as a volatile or persistent memory, a hard-disk, a compact disk (CD), or other tangible medium. Hardware implementations may include configured processors, logic circuits, application specific integrated circuits, and/or other types of hardware components. Further, combined software/hardware implementations may include both machine-executable instructions stored in a non-transitory machine-readable medium, as well as one or more hardware components, for example, processors, memories, etc. In general, it should be understood that the above descriptions are meant to be taken only by way of example.

What is claimed is:

1. A method comprising:
   determining services in rooms of a home automation system whose states are to be captured;
   automatically capturing a set of states of the services that describe a current operating condition in the home automation system, the automatically-captured set of states including states of the services provided by multiple different types of devices, the multiple different types including two or more of audio/video (A/V) devices, lighting devices, heating ventilation and cooling (HVAC) devices, security devices, shade control devices, energy conservation devices, or communications devices;
   receiving a user selection of a subset of the rooms in a user interface (UI) of a control device;
   receiving a user selection of a subset of the services in the user-selected subset of rooms in the UI on the control device;
   in response to receiving the user-selected subset of rooms and the user-selected subset of services, generating a user-defined scene from the automatically-captured set of states for the user-selected subset of rooms and the user-selected subset of services, the generating to exclude states for one or more of the rooms that are not a part of the user-selected subset of rooms and states for one or more services that are not a part of the user-selected subset of services in the user-selected subset of rooms;
   storing the user-defined scene on a storage device of the home automation system;
   determining the user-defined scene is to be activated; and
   controlling services provided by the multiple different types of devices of the home automation system to replicate the automatically-captured set of states of the user-defined scene in the user-selected subset of rooms for the user-selected subset of services.

2. The method of claim 1, wherein the determining services comprises:
   determining one or more A/V services whose A/V states are to be captured.

3. The method of claim 1, wherein the determining services comprises:
   determining one or more lighting services whose lighting states are to be captured.

4. The method of claim 1, wherein the determining services comprises:
   determining one or more HVAC services whose HVAC states are to be captured.

5. The method of claim 1, wherein the automatically capturing current states in the home automation system for the services comprises:
   fetching the current states from a state center maintained by a host controller of the home automation system.

6. The method of claim 1, further comprising:
   determining a last media query performed by the home automation system, wherein the last media query indicates an audio or video item, and
   wherein the generating the user-defined scene includes storing the last media query.

7. The method of claim 1, wherein the determining the user-defined scene is to be activated comprises:
   determining a scheduled time of day has been reached.

8. The method of claim 1, wherein the determining the user-defined scene is to be activated comprises:
   determining a celestial reference has been reached.

9. The method of claim 1, wherein the determining the user-defined scene is to be activated comprises:
   determining a countdown timer has expired.

10. The method of claim 1, wherein the determining the user-defined scene is to be activated comprises:
    determining user input has been received in a user interface (UI) on a control device, the user input selecting the user-defined scene for activation.

11. The method of claim 1, wherein the controlling comprises:
    loading the user-defined scene;
    converting the states maintained in the user-defined scene into service requests; and
    issuing the service requests to control the multiple different types of devices of the home automation system.

12. The method of claim 11, wherein the converting comprises:

converting one or more A/V states of A/V devices to service requests, converting one or more lighting states of lighting devices to service requests, or converting one or more HVAC states of HVAC devices to service requests.

13. The method of claim 1, wherein the user-defined scene stores a last media query and the controlling comprises:
issuing a request for the stored last media query to cause playback of audio or video content.

14. An apparatus comprising:
a processor; and
a memory coupled to the processor and configured to store processor-executable instructions for a scene engine that when executed are operable to:
automatically capture a set of states of services that describe a current operating condition in a home automation system, the automatically-captured set of states including states of the services provided by multiple different types of devices, the multiple different types including two or more of audio/video (A/V) devices, lighting devices, heating ventilation and cooling (HVAC) devices, security devices, shade control devices, energy conservation devices, or communications devices,
receive a user selection of a subset of the services,
in response to receipt of the user-selected subset of services, generate a user-defined scene from the automatically-captured set of states for the user-selected subset of services, the generation to exclude states for one or more services that are not a part of the user-selected subset of services,
schedule the user-defined scene to activate in response to a trigger,
store the user-defined scene,
determine the trigger has been reached,
convert the user-defined scene into a plurality of service requests, and
control services provided by the multiple different types of devices of the home automation system by issuing the plurality of service requests.

15. The apparatus of claim 14, wherein the trigger is a scheduled time, a celestial reference or a countdown timer.

16. The apparatus of claim 14, wherein the services comprise one or more A/V services whose A/V states are to be captured, one or more lighting services whose lighting states are to be captured and one or more HVAC services whose HVAC states are to be captured.

17. The apparatus of claim 14, wherein the processor-executable instructions for the scene engine when executed are operable to automatically capture current states by fetching the current states from a state center maintained by a host controller of the home automation system.

18. The apparatus of claim 14, wherein the processor-executable instructions for the scene engine when executed are further operable to:
determine a last media query performed by the home automation system, wherein the last media query indicates an audio or video item, and
store the last media query in the user-defined scene.

19. A non-transitory machine-readable medium having instruction stored thereon, the instructions when executed by one or more processors being operable to:
determine services in a home automation system whose states are to be captured;
automatically capture a set of states of the services that describe a current operating condition in the home automation system, the automatically-captured set of states including states of the services provided by multiple different types of devices, the multiple different types including two or more of audio/video (A/V) devices, lighting devices, heating ventilation and cooling (HVAC) devices, security devices, shade control devices, energy conservation devices, or communications devices;
receive a user selection of a subset of the services,
generate a user-defined scene from the automatically-captured set of states for the user-selected subset of services,
determine a last media query performed by the home automation system, wherein the last media query indicates an audio or video item,
in response to receipt of the user-selected subset of services and the determined last media query, generate a user-defined scene from the automatically-captured set of states for the user-selected subset of services and the last media query, the generation to exclude states for one or more services that are not a part of the user-selected subset of services;
store the user-defined scene on a storage device of the home automation system;
determine the user-defined scene is to be activated; and
convert the states maintained in the user-defined scene into service requests;
control the multiple different types of devices of the home automation system by issuing the plurality of service requests and
issue a request for the stored last media query to cause playback of the audio or video content.

* * * * *